United States Patent
Guo et al.

(10) Patent No.: US 9,636,900 B2
(45) Date of Patent: May 2, 2017

(54) DISPLAY SUBSTRATE AND METHOD FOR MANUFACTURING THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 296 days.

(21) Appl. No.: 14/492,755

(22) Filed: Sep. 22, 2014

(65) Prior Publication Data

US 2015/0253474 A1    Sep. 10, 2015

(30) Foreign Application Priority Data

Mar. 6, 2014   (CN) .......................... 2014 1 0081105

(51) Int. Cl.
*B32B 38/00* (2006.01)
*G02F 1/1335* (2006.01)
(Continued)

(52) U.S. Cl.
CPC .......... *B32B 38/0008* (2013.01); *B32B 17/00* (2013.01); *G02B 1/04* (2013.01);
(Continued)

(58) Field of Classification Search
CPC ................ B32B 38/0008; B32B 17/00; B32B 2307/412; B32B 2315/08; B32B 2457/20;
(Continued)

(56) References Cited

U.S. PATENT DOCUMENTS

2012/0188746 A1*  7/2012  Lee .................. B29D 11/00634
                                                            362/84
2013/0003163 A1   1/2013  Nowatzyk et al.
(Continued)

FOREIGN PATENT DOCUMENTS

CN       203069818 U      7/2013
CN       103412435 A     11/2013
(Continued)

OTHER PUBLICATIONS

First Office Action regarding Chinese application No. 201410081105.4, dated Feb. 1, 2016. Translation provided by Dragon Intellectual Property Law Firm.

*Primary Examiner* — Laura Tso (74) *Attorney, Agent, or Firm* — Harness, Dickey & Pierce, P.L.C.

(57) ABSTRACT

The present invention relates to a display substrate and a method for manufacturing the same, and a display device, wherein the substrate comprises a sealed space formed therein, a quantum dot-polymer composite system is sealed in the sealed space, and the quantum dot-polymer composite system is configured to emit light with a second wavelength and light with a third wavelength when excited by light with a first wavelength.

19 Claims, 6 Drawing Sheets

(51) Int. Cl.
  *G02B 1/04*    (2006.01)
  *B32B 17/00*    (2006.01)
(52) U.S. Cl.
  CPC .. *G02F 1/133617* (2013.01); *B32B 2307/412* (2013.01); *B32B 2315/08* (2013.01); *B32B 2457/20* (2013.01); *G02F 2001/133614* (2013.01); *Y10T 156/10* (2015.01)
(58) Field of Classification Search
  CPC ... G02B 1/04; Y10T 156/10; G02F 1/133617; G02F 2001/133614
  USPC .................................................. 362/97, 97.1
  See application file for complete search history.

(56)             References Cited

U.S. PATENT DOCUMENTS

| 2013/0114301 | A1* | 5/2013 | Um ...................... G02B 6/0023 |
|---|---|---|---|
|  |  |  | 362/621 |
| 2013/0194783 | A1* | 8/2013 | Kang ................... G02B 6/0023 |
|  |  |  | 362/97.1 |
| 2013/0271700 | A1* | 10/2013 | Nakamura ........... G02B 6/0026 |
|  |  |  | 349/65 |
| 2014/0098515 | A1* | 4/2014 | Pickett .................... G09F 13/02 |
|  |  |  | 362/23.13 |

FOREIGN PATENT DOCUMENTS

| CN | 103443941 A | 12/2013 |
|---|---|---|
| KR | 20130009024 A | 1/2013 |

* cited by examiner

DISPLAY SUBSTRATE AND METHOD FOR MANUFACTURING THE SAME, AND DISPLAY DEVICE

CROSS REFERENCE TO RELATED APPLICATION

This application claims priority to Chinese Patent Application No. 201410081105.4 filed on Mar. 6, 2014, the disclosures of which are incorporated in their entirety by reference herein.

FIELD OF THE INVENTION

The present invention relates to the field of display technologies, and in particular, to a display substrate and a method for manufacturing the same, and a display device.

DESCRIPTION OF THE PRIOR ART

Highly efficient quantum dot phosphor particle is a granule that is larger than water molecule but smaller than virus. Based on the particle size thereof, highly efficient quantum dot phosphor particles may convert the light emitted by a light source of standard blue light light-emitting diode (LED) into light with different wavelengths, wherein large particles may be excited to emit long-wavelength light (red light), while small particles may convert the light emitted by the light source into short-wavelength light (green light), and a new spectrum may be formed when such different granules are mixed and irradiated by the light source. By making use of such a feature of the quantum dot, it is possible to manufacture a quantum dot enhanced film (QDEF), thereby realizing a high-quality tri-primary color white light by using a light source of standard blue light LED, and the display performance of liquid crystal display (LCD) may reach a higher level. The application of quantum dot materials to the display panel gives an opportunity of developing a new liquid crystal display mode, and the current application thereof to QD-LED and quantum dot backlight attracts the attention of many panel manufactures.

At present, the quantum dot enhanced film is usually applied in a backlight module. However, most of the quantum dot materials are cadmium-containing materials which are toxic, so that the surrounding encapsulation during the film manufacturing process becomes a major problem. Cadmium pollution will be caused in case of bad encapsulation, which is a severe hazard to the environment. Additionally, the quantum dot material itself may be invalid due to the influence of the oxygen and water in the air.

SUMMARY

It is an object of the present invention to solve the technical problem that it is difficult to encapsulate the quantum dot material within a display panel, cadmium pollution may be caused and the quantum dot material tends to be invalid.

Therefore, the present invention provides a display substrate, wherein the display substrate comprises a sealed space formed within the display substrate, a quantum dot-polymer composite system is sealed in the sealed space, and quantum dot particles in the quantum dot-polymer composite system is configured to emit light with a second wavelength and light with a third wavelength when excited by light with a first wavelength.

According to an embodiment of the present invention, the sealed space is a tubular space.

According to an embodiment of the present invention, the sealed space comprises a plurality of tubular spaces that extend in parallel and are spaced apart from each other; and/or the sealed space comprises a tubular space that is curved back and forth continuously.

According to an embodiment of the present invention, the tubular space is cylindrical or elliptical cylindrical.

According to an embodiment of the present invention, when the tubular space is cylindrical, a diameter of cross section thereof is in a range of 5-20 microns; and when the tubular space is elliptical cylindrical, a minor axis diameter of cross section and a major axis diameter of cross section thereof are both in a range of 5-20 microns.

According to an embodiment of the present invention, in the case that the sealed space comprises a plurality of tubular spaces that extend in parallel and are spaced apart from each other, the plurality of tubular spaces are distributed uniformly in the display substrate; and in the case that the sealed space comprises a tubular space that is curved back and forth continuously, all curved segments of the tubular space that is curved back and forth continuously are distributed uniformly in the display substrate.

According to an embodiment of the present invention, the light with the first wavelength is blue light, the light with the second wavelength is red light and the light with the third wavelength is green light.

According to an embodiment of the present invention, the display substrate further comprises a black matrix, wherein the black matrix is formed on a surface of the substrate that the surface of the substrate faces an irradiation of the light with the first wavelength, and is located at a position corresponding to a region in a display region of the display substrate where no sealed space is formed.

According to an embodiment of the present invention, the quantum dot-polymer composite system comprises a first polymer and quantum dot particles dispersed among the first polymer.

According to an embodiment of the present invention, a polymeric monomer of the first polymer before polymerization is at least one of a double bond-containing acrylic ester, a phenolic resin derivative, a diazonaphthol derivative, and tetramethylammonium hydroxide which is a developer.

The present invention further provides a liquid crystal display device, which comprises: the above-mentioned display substrate; and a backlight module, which is located under the display substrate and configured to emit the light with the first wavelength.

According to an embodiment of the present invention, the black matrix is formed on a surface of the substrate that the surface of the substrate faces the irradiation of the light with the first wavelength emitted by the backlight module, and is located at a position corresponding to a region in a display region of the display substrate where no sealed space is formed.

The present invention further provides a method for manufacturing a display substrate, which comprises: forming a sealed space in the display substrate; filling a quantum dot-polymer composite system in the sealed space, wherein quantum dot particles in the quantum dot-polymer composite system is configured to emit light with a second wavelength and light with a third wavelength when excited by light with a first wavelength; and sealing the sealed space filled with the quantum dot-polymer composite system.

According to an embodiment of the present invention, the step of forming a sealed space in the display substrate comprises: providing two substrates; interposing a second polymer between the two substrates according to the pattern of the sealed space; heating and melting the two substrates and applying a pressure so as to make the two substrates merge together; and further heating the merged substrates to ashing the second polymer therein, and removing the ashed second polymer.

According to an embodiment of the present invention, the step of filling a quantum dot-polymer composite system in the sealed space comprises: flowing a liquid quantum dot-polymer composite system into the sealed space; and curing the quantum dot-polymer composite system to make the quantum dot particles in the quantum dot-polymer composite system unable to move freely.

According to an embodiment of the present invention, the step of curing the quantum dot-polymer composite system comprises: performing ultraviolet light irradiation to the quantum dot-polymer composite system so as to make the polymeric monomer of the first polymer in the quantum dot-polymer composite system polymerize to generate a macromolecule network.

According to an embodiment of the present invention, the method further comprises: vacuumizing the sealed space before flowing a liquid quantum dot-polymer composite system into the sealed space.

According to an embodiment of the present invention, the above method further comprises: forming a black matrix on the surface of the substrate, wherein the black matrix is formed on a surface of the substrate that the surface of the substrate faces an irradiation of the light with the first wavelength, and is located at a position corresponding to a region in a display region of the display substrate where no sealed space is formed.

According to an embodiment of the present invention, the step of sealing the sealed space filled with the quantum dot-polymer composite system comprises: coating a liquid third polymer on an end portion of the sealed space, and curing the liquid third polymer; or coating a molten glass on an end portion of the sealed space, and curing the molten glass.

By employing the display substrate and the method for manufacturing the same, and the display device disclosed by the present invention, quantum dot material can be well sealed, and the present invention is easy to be implemented and is applicable to various display devices.

BRIEF DESCRIPTION OF THE DRAWINGS

The characteristics and advantages of present invention will be better understood with reference to the accompanying drawings which are exemplary and should not be taken as a limitation of the present invention. In the drawings.

DETAILED DESCRIPTION OF THE PREFERRED EMBODIMENTS

Hereafter, embodiments of the present invention will be described in detail in conjunction with the drawings.

Figure 1A:
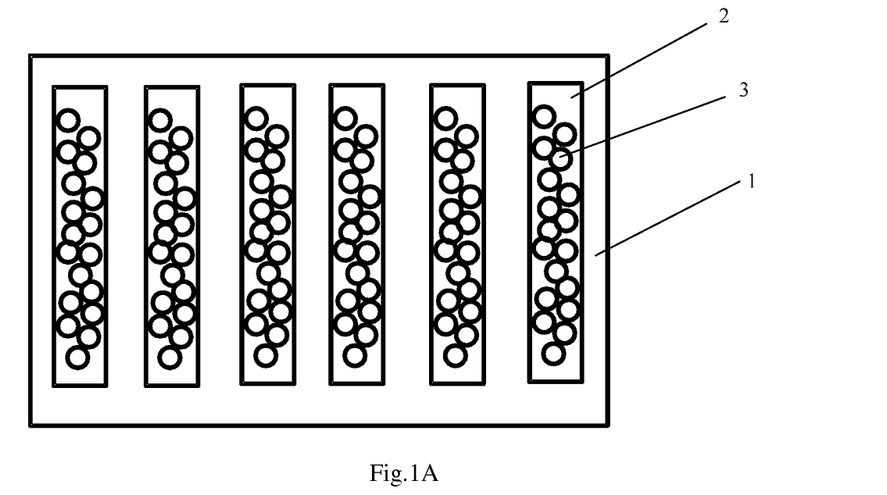
FIG. 1A shows a plan view of a display substrate according to an embodiment of the present invention.
Figure 1B:
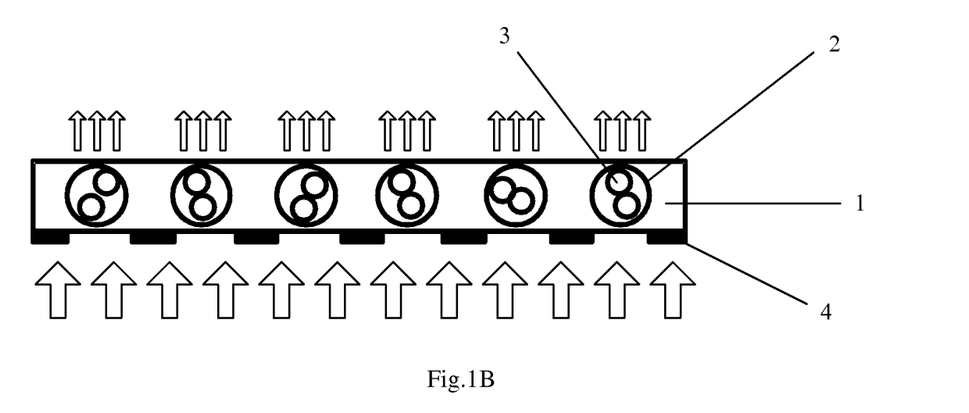
FIG. 1B shows a sectional view of a display substrate according to an embodiment of the present invention.

FIG. 1A and FIG. 1B show a display substrate according to an embodiment of the present invention. A substrate 1 is patterned so as to form a plurality of sealed spaces 2 at the positions used for light transmission, wherein the substrate 1 is a glass substrate according to an embodiment of the present invention, and the sealed space 2 may be a tubular space. As shown in FIG. 1A and FIG. 1B, the sealed space 2 comprises a plurality of tubular spaces that extend in parallel and are spaced apart from each other, the plurality of tubular spaces are distributed uniformly in the substrate 1, and the tubular space is cylindrical or elliptical cylindrical. When the tubular space is cylindrical, the diameter of cross section thereof is in a range of 5-20 microns; and when the tubular space is elliptical cylindrical, the minor axis diameter of cross section and the major axis diameter of cross section thereof are both in a range of 5-20 microns. However, the shape of the sealed space is not limited hereto, the sealed space may be configured to be other shapes such as rectangular column, triangular column and polygonal column, by one skilled in the art as required.

The sealed space 2 is filled with a quantum dot-polymer composite system 3. When excited by light with a first wavelength, the quantum dot particles in the quantum dot-polymer composite system 3 is configured to emit light with a second wavelength and light with a third wavelength. Specifically, the light with the first wavelength may be blue light, the light with the second wavelength may be red light and the light with the third wavelength may be green light; that is, the quantum dot particles are configured to emit red light and green light when excited by blue light. The quantum dot-polymer composite system 3 comprises a first polymer and quantum dot particles dispersed among the first polymer, wherein in an embodiment of the present invention, the polymeric monomer of the first polymer before polymerization is at least one of a double bond-containing acrylic ester, a phenolic resin derivative, a diazonaphthol derivative, and tetramethylammonium hydroxide which is a developer. The quantum dot-polymer composite system 3 may be formed by mixing quantum dot particles into a liquid polymeric monomer of the first polymer before polymerization and making the quantum dot particles suspend uniformly among the liquid polymeric monomer of the first polymer, and then polymerizing the polymeric monomer of the first polymer. The quantum dot particle is a core-shell nanoparticle and the core-shell structure tends to decompose due to the influence of external environment factors such as water and oxygen. By stabilizing the quantum dot particles in the polymerized first polymer to form the quantum dot-polymer composite system 3 and sealing it within the sealed space 2, the encapsulation and protection of the quantum dot particles can be realized.

According to the display substrate provided by the embodiment of the present invention, a sealed space is formed in the display substrate to seal the quantum dot-polymer composite system, therefore, the display substrate may be used as an array substrate and a film transistor array can be manufactured on the display substrate directly, so that a display panel that employs the display substrate can be thinned.

Further, a black matrix 4 is formed on a surface on the substrate 1 that the surface of the substrate 1 faces the irradiation of blue light, and is located at a position corresponding to a region in a display region of the substrate 1 where no sealed space 2 is formed. The black matrix 4 may be formed via a masking process.

As shown in FIG. 1B, the sealed space 2 is formed at the positions for light transmission in the substrate 1, and the black matrix 4 is configured at the rest positions of the substrate 1, so that the pattern of the light-emitting region can be controlled. When the back side of the substrate 1 is excited by the blue light emitted by a backlight module, the quantum dot particles in the sealed space 2 are excited by the blue light and emit red light and green light, and therefore a white light is generated for display by incorporating the blue light emitted by the backlight module with the red light and the green light. At other positions, light cannot penetrate through because it is sheltered by the black matrix 4.

Figure 2:
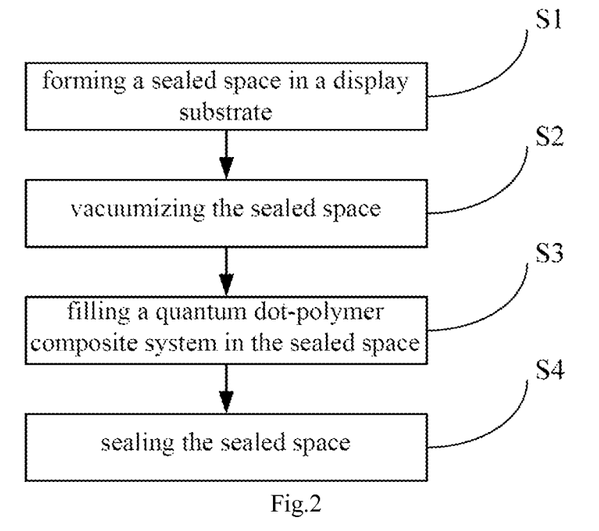
FIG. 2 shows a flow chart of a method for manufacturing a display substrate according to an embodiment of the present invention.

FIG. 2 shows a flow chart of a method for manufacturing a display substrate according to an embodiment of the present invention, which includes the steps below:

Step S1: forming a sealed space in the display substrate;
Step S2: vacuumizing the sealed space;
Step S3: filling a quantum dot-polymer composite system in the sealed space; and
Step S4: sealing the sealed space filled with the quantum dot-polymer composite system.

For Step S1, one skilled in the art may form the sealed space in the display substrate in various ways. For example, two glass substrates may be employed, and a second polymer may be interposed between the two glass substrates according to a pattern of the sealed space; the glass substrates may be heated to melt the glass, and a pressure may be applied to the glass substrates to make the two glass substrates merge together, so that the second polymer is enclosed in the glass substrates; the glass substrates may be further heated to ash the second polymer therein, the ashed second polymer may be removed from the glass substrates, and the glass substrates with sealed space can be obtained. The polymeric monomer of the second polymer may be at least one of a double bond-containing acrylic ester, a phenolic resin derivative, a diazonaphthol derivative, and tetramethylammonium hydroxide which is a developer, and the second polymer may be a material which is the same with or different from the first polymer.

In Step S2, the purpose of vacuumizing the sealed space is to facilitate the flowing of the liquid quantum dot-polymer composite system into the sealed space better. It is an optional step, and it should be understood by one skilled in the art that this step may be omitted.

Step S3 specifically includes: flowing the liquid quantum dot-polymer composite system into the sealed space spontaneously, wherein the reason that the quantum dot-polymer composite system can flow into the sealed space spontaneously is because the quantum dot-polymer composite system is in a liquid state before polymerization; and in the condition that the sealed space is filled with the liquid quantum dot-polymer composite system, performing ultraviolet light irradiation to the liquid quantum dot-polymer composite system, thereby polymerizing the polymeric monomer of the first polymer in the quantum dot-polymer composite system to generate a macromolecule network, and stabilizing the quantum dot particles to make them unable to move freely.

For Step S4, the end portion of the sealed space must be sealed so as to avoid a decrease of the luminous efficiency of the quantum dot-polymer composite system due to the decompose of the quantum dot-polymer composite system in the air and vapour. Specifically, the end portion of the sealed space may be sealed by means of sealing with polymer or glass For example, a liquid third polymer may be coated on the end portion of the sealed space, and then the third polymer may be cured via polymerization, so that the end portion of the sealed space is sealed; or, molten glass may be coated on the end portion of the sealed space, and then the molten glass may be cured via cooling, so that the end portion of the sealed space is sealed. It should be understood by one skilled in the art that other sealing modes are also applicable. The polymeric monomer of the third polymer may be at least one of a double bond-containing acrylic ester, a phenolic resin derivative, a diazonaphthol derivative, and tetramethylammonium hydroxide which is a developer, and the third polymer may be a material the same with or different from the first polymer.

Figure 3:
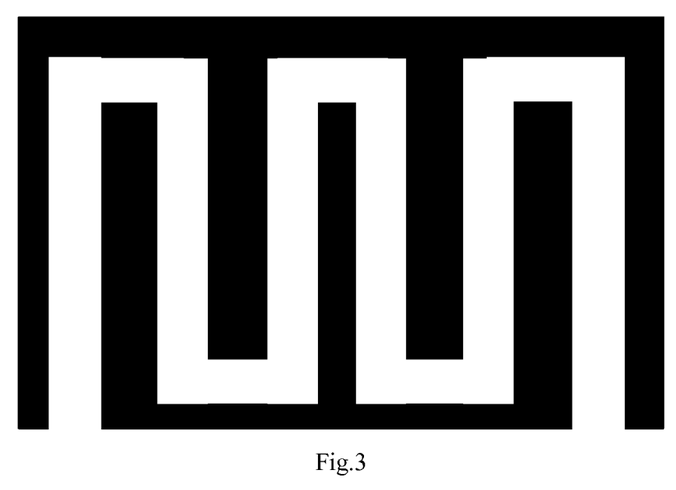
FIG. 3 shows a plan view of a display substrate according to another embodiment of the present invention.

The patterning of the sealed space may be as shown in FIG. 1A, wherein it comprises a plurality of tubular spaces that extend in parallel and are spaced apart from each other; or the patterning of the sealed space may be as shown in FIG. 3, wherein it comprises a space that is curved back and forth continuously, and the sealed space is substantially distributed uniformly in the display substrate. The above are only examples, and various changes and modifications may be made to the patterning of the sealed space by one skilled in the art as required. Specifically, in the patterning of the sealed space as shown in FIG. 3, the pattern of the sealed space is in a shape of "n", thus the filling of quantum dot particles in the whole display substrate can be accomplished by filling the quantum dot-polymer composite system in one time; in addition, for sealing the end portion of the sealed space, only the two end portions need to be sealed. On the other hand, in the patterning of the sealed space shown in FIG. 1A, each sealed space needs to be filled with the quantum dot-polymer composite system, and the two end portions of each sealed space need to be sealed.

FIGS. 4 to 12 show a method for manufacturing a display panel according to embodiment of the present invention.

Figure 4:
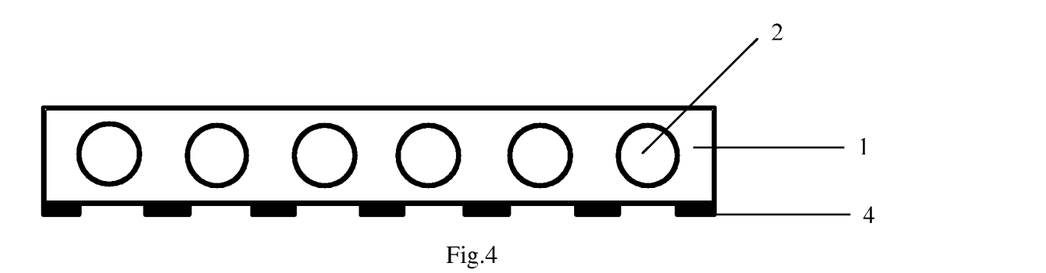
FIGS. 4 to 12 show a method for manufacturing a display panel device according to an embodiment of the present invention.

As shown in FIG. 4, a sealed space 2 is formed in a substrate 1, and then a black matrix 4 is formed on the lower surface of a display region of the substrate 1 where no sealed space 2 is formed.

Figure 5:
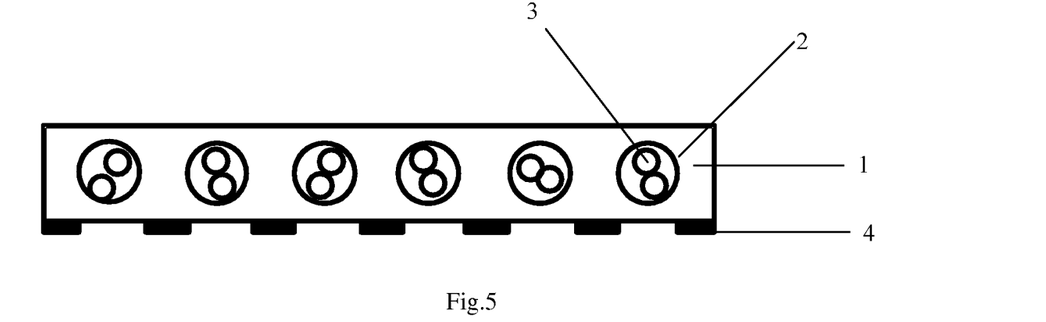

As shown in FIG. 5, the sealed space 2 is filled with a quantum dot-polymer composite system, and the end portion of the sealed space 2 is sealed.

Figure 6:
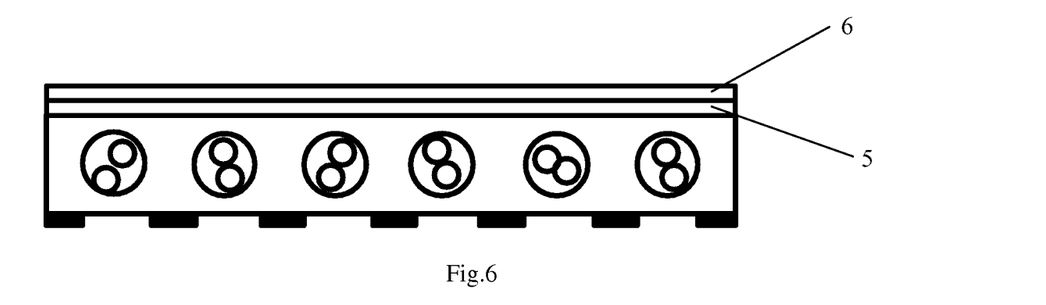

As shown in FIG. 6, a polaroid 5 is attached to the upper surface of the substrate 1, and a first passivation layer 6 is deposited on the polaroid 5 for planarizing the surface.

Figure 7:
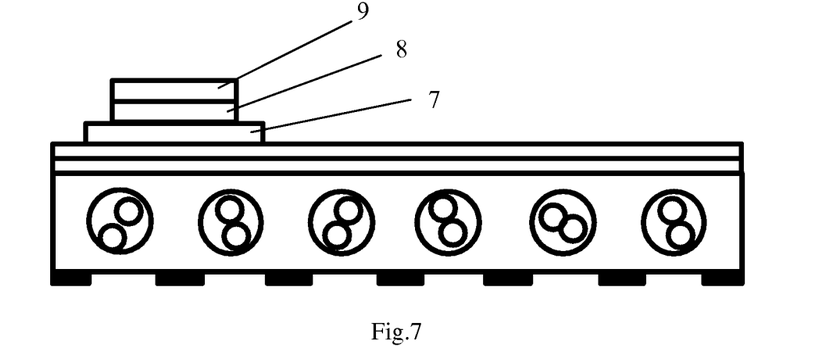

As shown in FIG. 7, an active layer 7, a gate insulating layer 8 and a gate 9 are formed on the passivation layer 6 in sequence.

Figure 8:
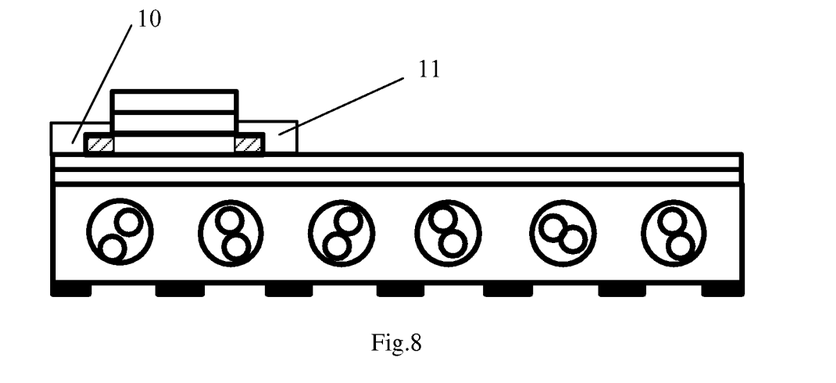

As shown in FIG. 8, ion implantation is performed to the active layer 7 so as to form a source and a drain by utilizing the gate insulating layer 8 and the gate 9 as a mask, and a source electrode 10 and a drain electrode 11 are formed on the source and the drain.

Figure 9:
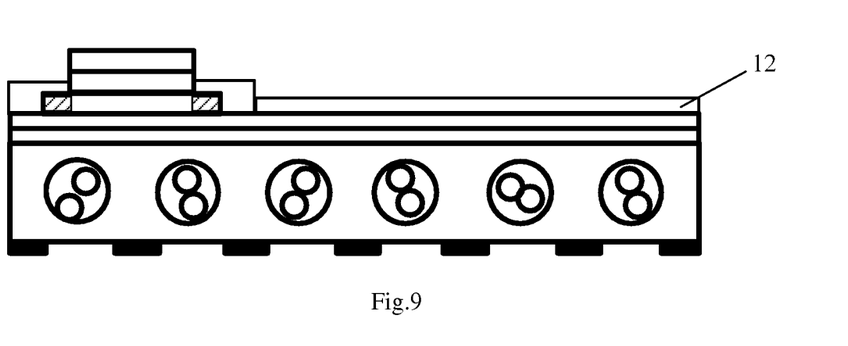

As shown in FIG. 9, a first transparent electrode 12 electrically connected with the drain electrode 11 is formed on the substrate 1 as a pixel electrode.

Figure 10:
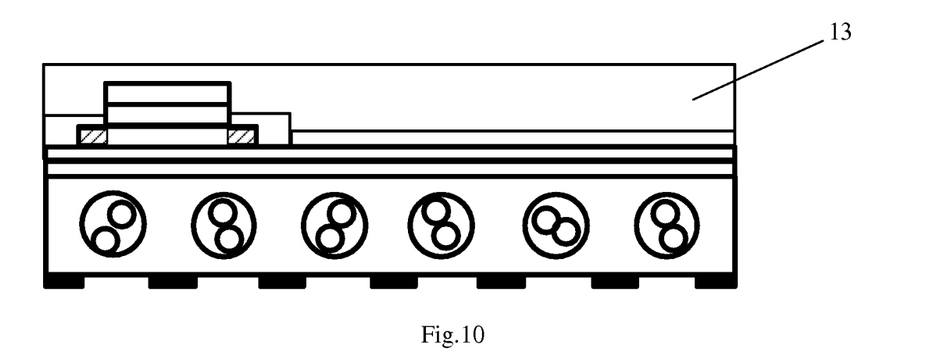

As shown in FIG. 10, a second passivation layer 13 is formed on the substrate 1 for planarizing the surface.

Figure 11:
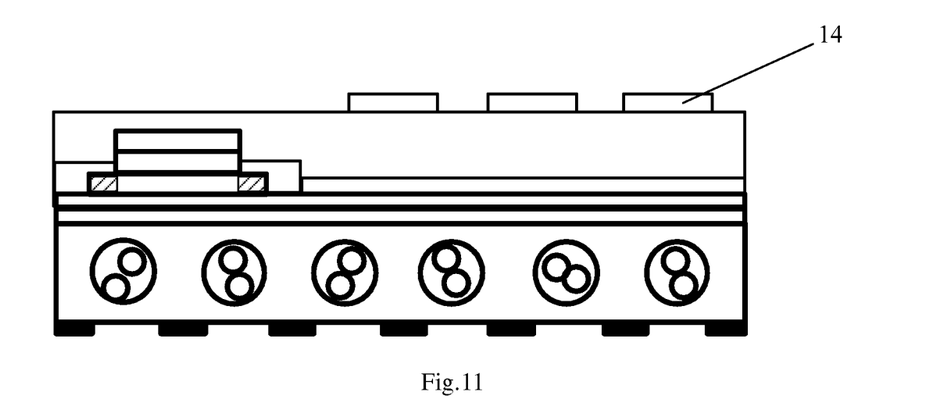

As shown in FIG. 11, a second transparent electrode 14 is formed on the second passivation layer 13 as a common electrode.

Figure 12:
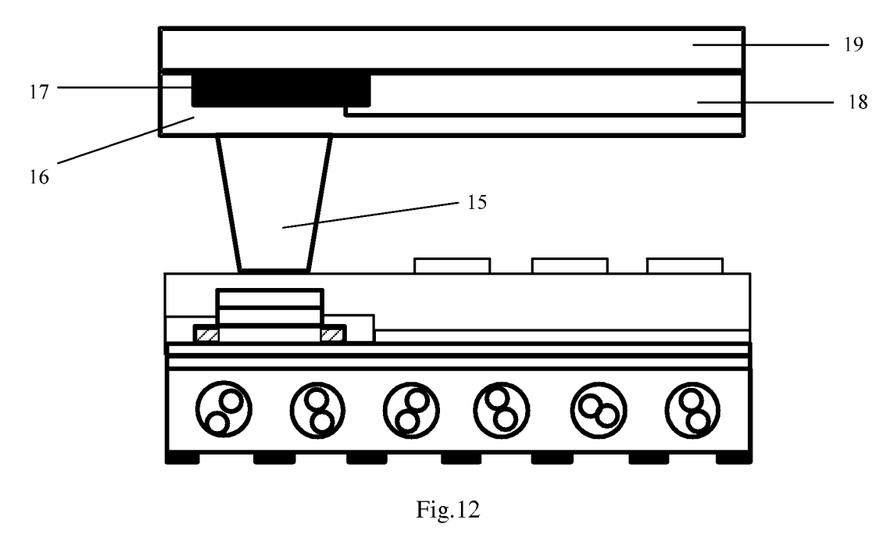

FIG. 12 shows the display panel finally formed according to the embodiment of the present invention. A black matrix 17 and a filter color resistance layer 18 are formed on an upper substrate 19, and the black matrix 17 and the filter color resistance layer 18 are covered by an orientation layer 16. A certain interval is kept between the upper substrate 19 and the lower substrate 1 via a spacer 15, between which a liquid crystal layer may be provided so as to form a liquid crystal display device.

The liquid crystal display device may be any product or component that has a display function, such as liquid crystal display panel, mobile phone, tablet computer, TV, display, notebook computer, digital photo frame and navigator.

The present invention has been illustrated above by taking an Advanced super-Dimension Switch (ADS) mode display panel with a top gate structure as an example. However, the present invention is not limited hereto. It should be understood by one skilled in the art that display panels of other modes such as Twisted Nematic (TN) mode and In-Plane Switching (IPS) mode may also be applicable, and a display panel with a bottom gate structure may also be applicable.

By forming the sealed space within the glass substrate to seal a quantum dot-polymer composite system, the glass substrate may be used as an array substrate and a film transistor array can be manufactured on it directly, so that the display panel can be thinned. Additionally, such a glass substrate could be combined with the manufacturing of a display panel so as to directly function as a lower substrate of the display panel, and each layer of the film transistor array may be deposited thereon to manufacture an integrated display panel.

Although the embodiments of the present invention have been described above in conjunction with the drawings, various modifications and variations may be made by one skilled in the art without departing from the spirit and scope of the present invention, and all such modifications and variations will fall into the scope as defined by the appended claims.

What is claimed is:

1. A display substrate, comprising a sealed space formed within the display substrate, wherein a quantum dot-polymer composite system is sealed in the sealed space, and quantum dot particles in the quantum dot-polymer composite system is configured to emit light with a second wavelength and light with a third wavelength when excited by light with a first wavelength, and
   wherein the display substrate further comprises a black matrix, the black matrix being formed on a surface of the substrate that faces an irradiation of the light with the first wavelength, and being located at a position corresponding to a region in a display region of the display substrate where no sealed space is formed.

2. The display substrate according to claim 1, wherein the sealed space is a tubular space.

3. The display substrate according to claim 1, wherein the sealed space comprises a plurality of tubular spaces that extend in parallel and are spaced apart from each other.

4. The display substrate according to claim 3, wherein the tubular space is in a cylindrical or elliptical cylindrical shape.

5. The display substrate according to claim 4, wherein when the tubular space is in a cylindrical shape, a diameter of a cross section of the tubular space is in a range of 5-20 microns; and when the tubular space is in an elliptical cylindrical shape, a minor axis diameter of the cross section and a major axis diameter of the cross section of the tubular space are both in a range of 5-20 microns.

6. The display substrate according to claim 3, wherein the plurality of tubular spaces are distributed uniformly in the display substrate.

7. The display substrate according to claim 1, wherein the light with the first wavelength is blue light, the light with the second wavelength is red light and the light with the third wavelength is green light.

8. The display substrate according to claim 1, wherein the quantum dot-polymer composite system comprises a first polymer and quantum dot particles dispersed among the first polymer.

9. The display substrate according to claim 8, wherein a polymeric monomer of the first polymer before polymerization is at least one of a double bond-containing acrylic ester, a phenolic resin derivative, a diazonaphthol derivative, and tetramethylammonium hydroxide.

10. A liquid crystal display device, comprising:
    the display substrate according to claim 1; and
    a backlight module, which is located under the display substrate and configured to emit the light with the first wavelength.

11. The display substrate according to claim 1, wherein the sealed space comprises a tubular space that is curved back and forth continuously.

12. The display substrate according to claim 11, wherein each curved segment of the tubular space that is curved back and forth continuously are distributed uniformly in the display substrate.

13. A method for manufacturing a display substrate, comprising the steps of:
    forming a sealed space in the display substrate;
    filling a quantum dot-polymer composite system in the sealed space, wherein quantum dot particles in the quantum dot-polymer composite system is configured to emit light with a second wavelength and light with a third wavelength when excited by light with a first wavelength; and
    sealing the sealed space filled with the quantum dot-polymer composite system,
    wherein the display substrate further comprises a black matrix, the black matrix being formed on a surface of the substrate that faces an irradiation of the light with the first wavelength, and being located at a position corresponding to a region in a display region of the display substrate where no sealed space is formed.

14. The method according to claim 13, wherein the step of forming a sealed space in the display substrate comprises:
    providing two substrates;
    interposing a second polymer between the two substrates according to a pattern of the sealed space;
    heating and melting the two substrates and applying a pressure so as to make the two substrates merge together; and
    further heating the merged substrates to ashing the second polymer therein, and removing the ashed second polymer.

15. The method according to claim 13, wherein the step of filling a quantum dot-polymer composite system in the sealed space comprises:
    flowing a liquid quantum dot-polymer composite system into the sealed space; and
    curing the quantum dot-polymer composite system to make the quantum dot particles in the quantum dot-polymer composite system unable to move freely.

16. The method according to claim 15, wherein the step of curing the quantum dot-polymer composite system comprises:
    performing ultraviolet light irradiation to the quantum dot-polymer composite system so as to make polymeric monomer of a first polymer in the quantum dot-polymer composite system polymerize to generate a macromolecule network.

17. The method according to claim 15, further comprising:
    vacuumizing the sealed space before flowing a liquid quantum dot-polymer composite system into the sealed space.

18. The method according to claim 13, further comprising:
   forming a black matrix on a surface of the display substrate, wherein the black matrix is formed on a surface of the substrate that the surface of the substrate faces an irradiation of the light with the first wavelength, and is located at a position corresponding to a region in a display region of the display substrate where no sealed space is formed.

19. The method according to claim 13, wherein the step of sealing the sealed space filled with the quantum dot-polymer composite system comprises:
   coating a liquid third polymer on an end portion of the sealed space, and curing the liquid third polymer; or
   coating a molten glass on an end portion of the sealed space, and curing the molten glass.

* * * * *